United States Patent
Luz et al.

[11] Patent Number: 6,088,399
[45] Date of Patent: Jul. 11, 2000

[54] MULTI-MODE TRANSMITTER AND RECEIVER

[75] Inventors: Yuda Yehuda Luz; Ron Rotstein, both of Buffalo Grove, Ill.

[73] Assignee: Motorola, Inc., Schaumburg, Ill.

[21] Appl. No.: 09/199,006

[22] Filed: Nov. 24, 1998

[51] Int. Cl.[7] .......................... H04L 27/28; H04L 27/04; H04L 27/06; H04K 1/00

[52] U.S. Cl. .................... 375/260; 375/140; 375/316; 375/295

[58] Field of Search .................... 375/260, 295, 375/298, 308, 261, 267, 279, 140, 146, 316, 130, 147; 332/103

[56] References Cited

U.S. PATENT DOCUMENTS

| | | | |
|---|---|---|---|
| 4,571,549 | 2/1986 | Lobs et al. | 375/298 |
| 5,175,514 | 12/1992 | Iinuma et al. | 375/308 |
| 5,412,351 | 5/1995 | Nystrom et al. | 375/308 |
| 5,638,401 | 6/1997 | Jones | 375/298 |
| 5,903,611 | 5/1999 | Schnabl et al. | 375/298 |

*Primary Examiner*—Tesfaldet Bocure
*Attorney, Agent, or Firm*—Kenneth A. Haas

[57] ABSTRACT

A transmitter (300) comprises summers (301–307, 3178–319), and mixers (309–315, 333). During multi-carrier transmission, multiple I and Q components enter the transmitter. $I_1$ is summed with $I_3$, $Q_3$ is subtracted from $Q_1$, $Q_1$ is added to $Q_3$, and $I_3$ is subtracted from $I_1$. The outputs of a first and a second summer (301, 305) enters a first and a second mixer (309, 313) where they are mixed by a cosine function. Similarly, the outputs of a third and a fourth summer (303, 307) enter a third and a fourth mixer (311, 315) where they are mixed by a sine function. The output from first and the second mixer (309, 311) enter a first summer (317) where they are summed along with the $I_2$ component. The output from the third and the fourth mixer (313, 315) enters a second summer (319) where they are summed along with the $Q_2$ component.

6 Claims, 6 Drawing Sheets

FIG. 1 — TRANSMITTER AND RECEIVER — PRIOR ART

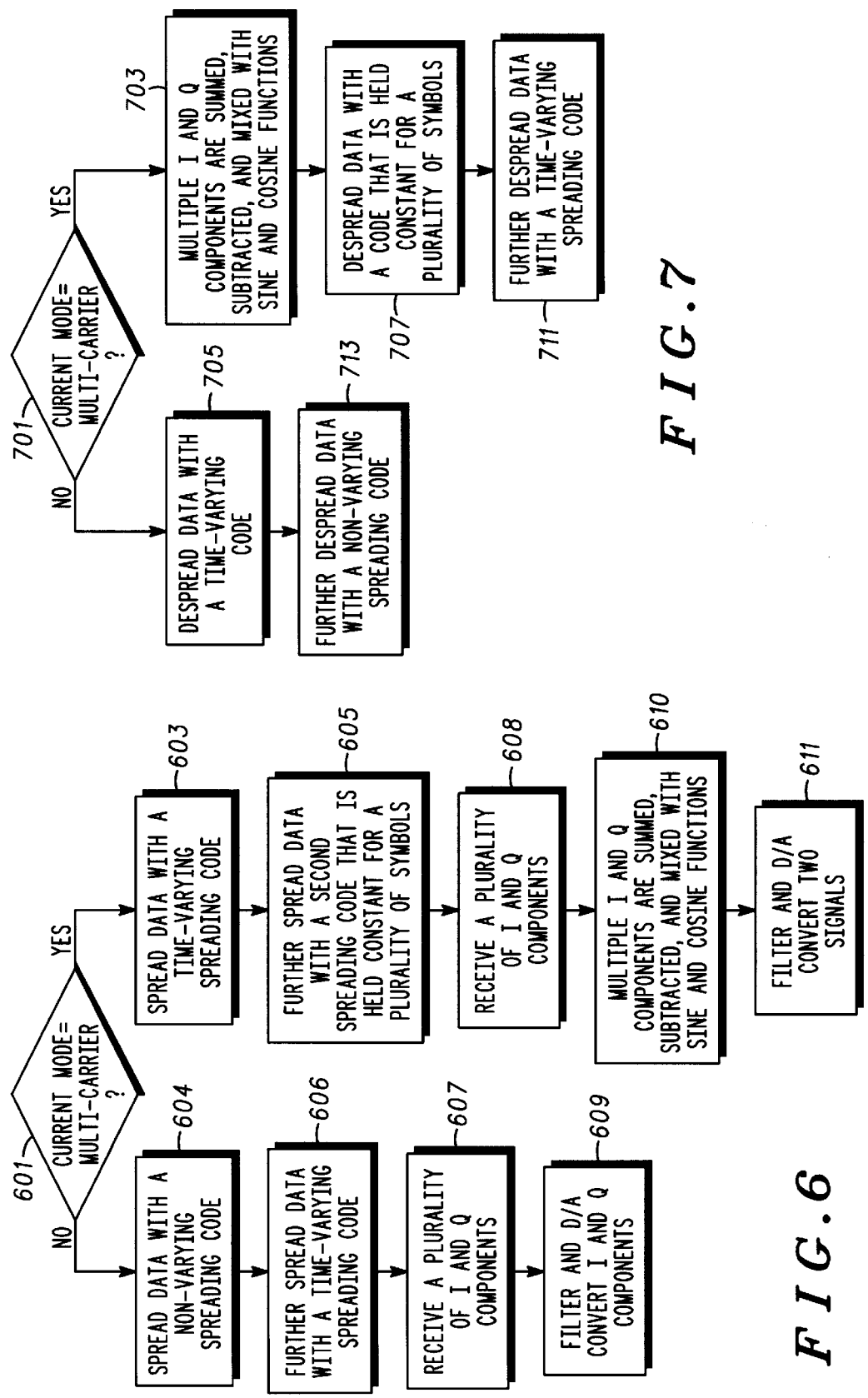

MULTI-MODE TRANSMITTER AND RECEIVER

FIELD OF THE INVENTION

The present invention relates generally to communication systems and, in particular, to a multi-mode transmitter and receiver for use in a spread-spectrum communication system.

RELATED INVENTIONS

The present invention is related to METHOD AND APPARATUS FOR SPREADING AND DESPREADING DATA IN A SPREAD-SPECTRUM COMMUNICATION SYSTEM, having Ser. No. 09/200,397 filed on Nov. 24, 1998 and assigned to the assignee of the present invention.

BACKGROUND OF THE INVENTION

Next generation spread-spectrum communication systems incorporate both a direct-spread and a multi-carrier option for transmission. One such communication system currently being developed with direct-spread and multi-carrier capabilities is the next generation Code-Division Multiple-Access (CDMA) cellular communication system, more commonly referred to as cdma2000, or IS95C.

During direct-spread transmission the communication systems transmit information over the bandwidth of interest by using a single short code. Unlike direct-spread transmission, multi-carrier transmission transmits information over the bandwidth of interest by using multiple short codes. For multi-carrier transmission, each portion of the user's data that is spread with a single short code is transmitted within its own frequency band. Such a multi-carrier transmitter and receiver is shown in FIG. 1. As shown, data stream 101 enters demultiplexer 103, where it is sent to three separate spreaders 105. Each spreading circuitry 105 utilizes its own, unique Walsh code as well as a common pseudo-noise (PN) code when spreading data stream 101. After low-pass filtering and digital-to-analog conversion, each data path is mixed to a separate frequency by mixers 107. The output of mixers 107 is a portion of data stream 101, mixed to a unique frequency. After bandpass filtering, the output from mixers 107 is summed by summer 109 and transmitted as signal 121 comprising three separate frequency bands, each frequency band utilizing a unique short code. During reception, the three separate frequency bands 121 are received by receiver 120 and downconverted to a single frequency by mixers 125. After filtering and analog-to-digital conversion, the three signal paths are despread utilizing three separate despreaders (not shown), each using a similar PN code and a unique Walsh code.

The use of multiple spreaders 105 in multi-mode transmitters, as well as the use of three separate Radio Frequency (RF) font and back ends (D/A converters, mixers 107, and broad band filters) makes multi-mode devices very expensive. Therefore a need exists for a multi-mode transmitter and receiver for transmitting and receiving a signal in a communication system utilizing both direct-spread and multi-carrier transmission, that is less costly than prior-art multi-mode transmitters and receivers.

BRIEF DESCRIPTION OF THE DRAWINGS

FIG. 6 is a flow chart illustrating operation of the transmitter of FIG. 2 and FIG. 3 in accordance with the preferred embodiment of the present invention.

FIG. 7 is a flow chart illustrating operation of the receiver of FIG. 4 and FIG. 5 in accordance with the preferred embodiment of the present invention.

DETAILED DESCRIPTION OF THE DRAWINGS

Figure 1:
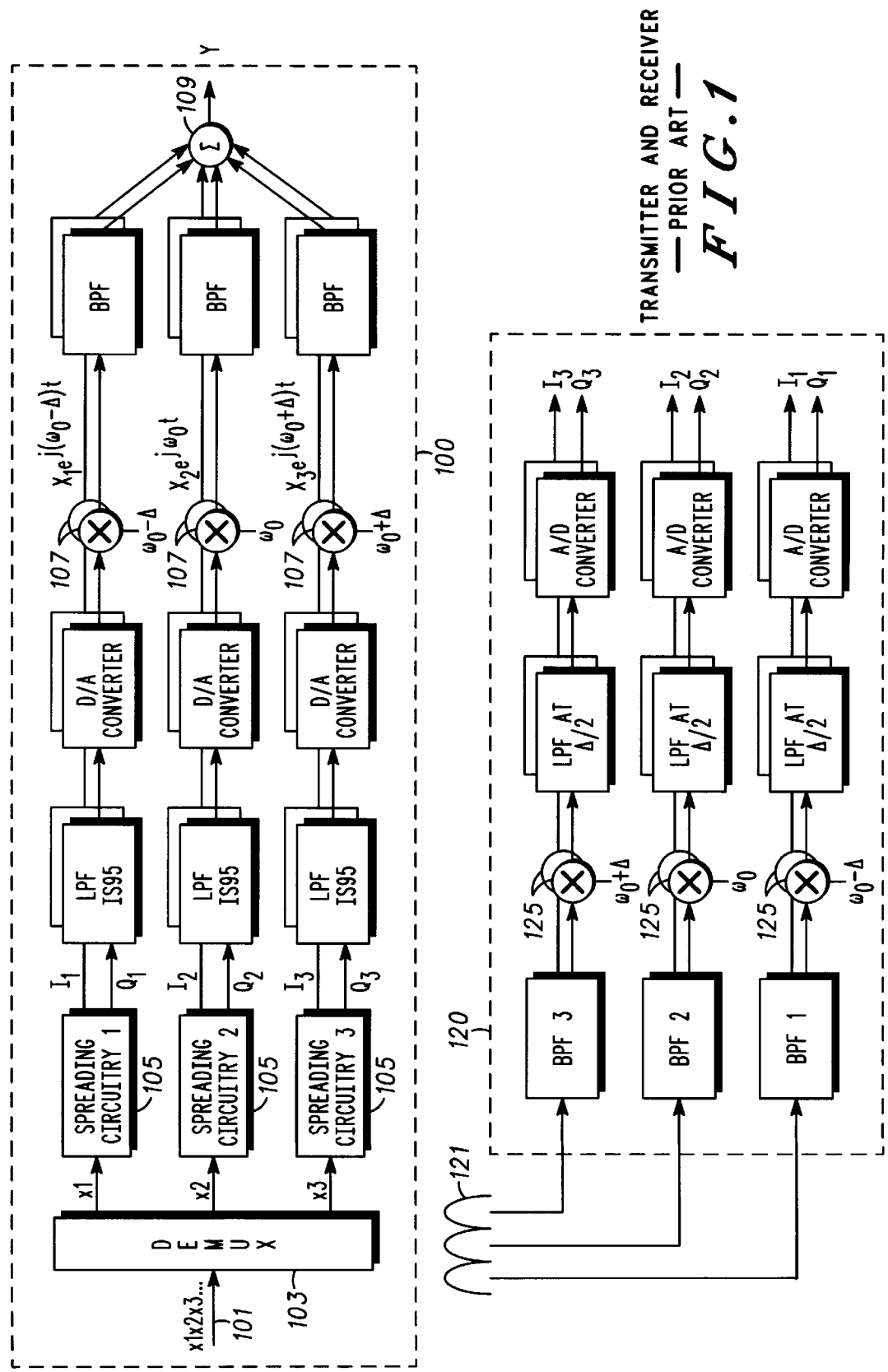
FIG. 1 is a block diagram of a prior-art transmitter and receiver that utilizes a multi-carrier form of transmission.

To address the need for a less expensive multi-mode transmitter, a transmitter is provided that comprises summers, and mixers. During multi-carrier transmission, multiple I and Q components enter the transmitter. $I_1$ is summed with $I_3$, $Q_3$ is subtracted from $Q_1$, $Q_1$ is added to $Q_3$, and $I_3$ is subtracted from $I_1$. The outputs of a first and a second summer enters a first and a second mixer where they are mixed by a cosine function. Similarly, the outputs of a third and a fourth summer enter a third and a fourth mixer where they are mixed by a sine function. The output from first and the second mixer enter a first summer where they are summed along with the $I_2$ component. The output from the third and the fourth mixer enters a second summer where they are summed along with the $Q_2$ component. The preferred transmitter allows for the use of circuitry that can be utilized during both multi-carrier and direct spread transmission, resulting in a multi-mode transmitter that is less costly than prior-art multi-mode transmitters.

The present invention encompasses a method for operating a multi-mode transmitter. The method comprises the steps of receiving a first, a second, and a third in phase component, and a first, a second, and a third quadrature component and determining a mode of operation. Based on the mode of operation, the first and the third in phase components are summed to produce a first summed component, and the third quadrature component is subtracted from the first quadrature component to produce a second summed component.

The present invention additionally encompasses a method for operating a multi-mode receiver. The method comprises the steps of receiving an in phase (I) and a quadrature (Q) digital stream and determining a mode of operation. Based on the mode of operation, the in phase digital stream is mixed with a cosine function to produce a first mixed stream and the quadrature digital stream is mixed with a sine function to produce a second mixed stream, and the first and the second mixed streams are summed and the second mixed stream is subtracted from the first mixed stream.

The present invention additionally encompasses a transmitter comprising a first summer having a first and a second in phase (I) component as an input and outputting a sum of the first and the second in phase component, a second summer having a first and a second quadrature (Q) component as an input and outputting a difference between the second quadrature component and the first quadrature component, a first mixer having the sum as an input and outputting the sum mixed with a cosine function, and a second mixer having the difference as an input and outputting the difference mixed with a sine function.

Finally, the present invention encompasses a receiver comprising a first mixer having an in phase (I) digital stream as an input and outputting the in phase digital stream mixed with a cosine function, a second mixer having a quadrature (Q) digital stream as an input and outputting the quadrature digital stream mixed with a sine function, a third mixer having the quadrature digital stream as an input and outputting the quadrature digital stream mixed with the cosine function, a fourth mixer having the in phase digital stream as an input and outputting the in phase digital stream mixed with the sine function, a first summer having the in phase digital stream mixed with a cosine function and the quadrature digital stream mixed with a sine function as inputs and outputting a difference between the in phase digital stream mixed with the cosine function and the quadrature digital stream mixed with the sine function, and a second summer having the quadrature digital stream mixed with the cosine function and the in phase digital stream mixed with the sine function as inputs and outputting a sum of the quadrature digital stream mixed with the cosine function and the in phase digital stream mixed with the sine function.

In the preferred embodiment of the present invention a transmitter and receiver are provided that utilize a direct-spread RF section for multi-carrier transmission. Prior to describing a transmitter and receiver in accordance with the preferred embodiment of the present invention the following text and equations are provided to set the necessary background for utilization of the preferred embodiment of the present invention.

In a multi-carrier transmission, the resulting signal (Y) can be represented as:

$$Y = X_1 e^{j(\omega_0 - \Delta)t} + X_2 e^{j\omega_0 t} + X_3 e^{j(\omega_0 + \Delta)t} = (X_1 e^{-j\Delta t} + X_2 + X_3 e^{j\Delta t}) e^{j\omega_0 t}, \quad (1)$$

where Y and $X_1$, $X_2$, $X_3$ are complex I+jQ quadrature signals. After up-conversion, the signal can be defined as:

$$Y = (I + jQ) e^{j\omega_0 t}$$

where $\omega_0$ is $$\frac{2\pi}{f_0},$$

$f_0$ the center frequency of an equivalent direct spread signal, $\Delta$ is the frequency offset between the carriers and t is time. Expressing the exponent in equation (1) as sine and cosine equivalents, equation (1) becomes:

$$I + jQ = X_1(\cos(-\Delta t) + j \sin(-\Delta t)) + X_2 + X_3(\cos(\Delta t) + j \sin(\Delta t)),$$

where $\Delta$ is the frequency offset between the carriers, which in the preferred embodiment is 1.5 MHz. Switching to the real and imaginary components $$I + jQ = (I_1 + jQ_1)(\cos(-\Delta t) + j \sin(-\Delta t)) + (I_2 + jQ_2) + (I_3 + jQ_3)(\cos(\Delta t) + j \sin(\Delta t)).$$

Multiplying and combining real and imaginary:

$$I_1 \cos(\Delta t) + Q_1 \sin(\Delta t) + j(Q_1 \cos(\Delta t) - I_1 \sin(\Delta t)) + I_2 + jQ_{2+j3} \cos(\Delta t) - Q_3 \sin(\Delta t) + j(Q_3 \cos(\Delta t) + I_3 \sin(\Delta t)) = I + jQ.$$

Deriving the I and Q components of the combined multi-mode transmnission:

$$I = (I_1 + I_3)\cos(\Delta t) + I_2 + (Q_1 - Q_3)\sin(\Delta t) \quad (2)$$

$$Q = (Q_1 + Q_3)\cos(\Delta t) + Q_2 + (I_3 - I_1)\sin(\Delta t). \quad (3)$$

Thus, the I and Q components of a multi-carrier signal can be represented as shown in equations (2) and (3). In the preferred embodiment of the present invention equations (2) and (3) are utilized to provide a multi-mode transmitter and receiver that uses a direct-spread RF section for multi-carrier transmission.

Figure 2:
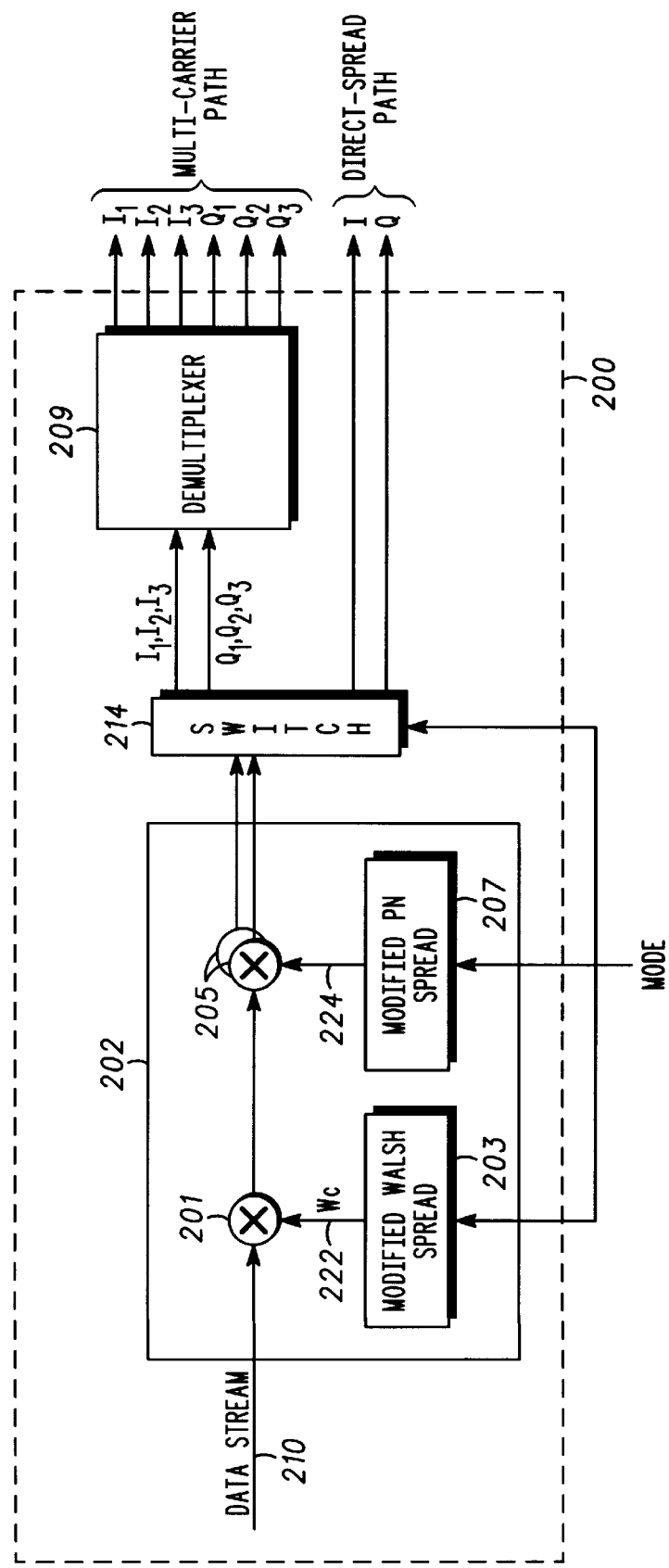
FIG. 2 is a block diagram of a multi-mode transmitter front end in accordance with the preferred embodiment of the present invention.

Turning now to the drawings, wherein like numerals designate like components, FIG. 2 is a block diagram of multi-mode transmitter front end 200 in accordance with the preferred embodiment of the present invention. In the preferred embodiment of the present invention, front end 200 has replaced the prior-art spreaders 105 with spreading circuitry 202. During operation, data stream 210 is received by Walsh spreader 201 at a particular symbol rate. Data stream 210 typically includes convolutionally encoded and interleaved voice converted to data by a vocoder, pure data, or a combination of the two types of data. Spreader 201 multiplies each data symbol within data stream 210 by an orthogonal code. In the preferred embodiment of the present invention, a 64-ary or 256-ary Walsh code is utilized for direct and multi-carrier spreading, respectively, however in alternate embodiments of the present invention, any M-ary Walsh code may be utilized. In M-ary orthogonal encoding, interleaved and scrambled data symbols are each replaced by a M symbol orthogonal code. These orthogonal codes preferably correspond to Walsh codes from a M×M Hadamard matrix wherein a Walsh code is a single row or column of the matrix. Spreader 201 repetitively outputs a Walsh code 222 which converts a single input data symbol to a series of chips. In the preferred embodiment of the present invention Walsh code 222 is varied at the symbol rate during multi-carrier transmission, and is held constant (i.e., a single Walsh code) during direct-spread transmission.

More particularly, a current mode of operation is provided to Walsh spreader 203, and based on the current mode of operation, spreader 203 either varies a Walsh code at a symbol rate, or holds the Walsh code constant. During multi-carrier transmission a first symbol within data stream 210 will be spread with a first Walsh code, while symbols immediately preceding and following the first symbol will be spread by a another, differing Walsh code. Additionally, in the preferred embodiment of the present invention during multi-carrier transmission all Walsh codes comprise 256 chips. During direct-spread transmission, a single Walsh code is utilized to spread all symbols within data stream 210. In the preferred embodiment of the present invention, the Walsh code utilized for direct-spread transmission comprises 64 chips.

The sequence of Walsh codes exiting spreader 201 is further scrambled by a pair of PN codes 224 to generate an I-channel and Q-channel spread sequence. In the preferred embodiment of the present invention, PN codes comprise a time varying code that is utilized to distinguish transmission from a particular cell. All forward channels in a communication system utilize the same PN code, however, the code is shifted in time between cells within the communication system. In the preferred embodiment of the present invention, PN code 224 is held constant for three Walsh code periods during multi-carrier transmission, and is not held constant during direct-spread transmission. More particularly, during multi-carrier transmission, three consecutive Walsh codes share the same time-varying PN code, as if they were transmitted simultaneously, while direct-spread transmission varies the PN code with every Walsh code.

The I-channel and Q-channel code spread sequences are passed to switch 214 where they are directed based upon the current mode of operation. For direct-spread transmission, demultiplexer 209 is bypassed, and the current I and Q streams are output to the transmitter back end. However, for multi-carrier transmission, the I and Q stream is demultiplexed into multiple I and Q components so that three consecutive I and Q streams are sent to a transmitter back end simultaneously. In the preferred embodiment of the present invention, each I and Q component of the simultaneous streams (e.g., $I_1$, $I_2$, $I_3$, $Q_1$, $Q_2$, $Q_3$) represents the baseband portion of a multi carrier signal. For example, the $I_1$ and $Q_1$ streams contain data that, for prior-art systems, would be broadcast within a single frequency band in a multicast transmission. Thus, in an n-carrier multicast system, the $I_i$ and $Q_i$ streams contain data representing every i+3k symbol from data stream 210, where k is an integer and i is an integer between 1 and n.

The preferred embodiment of the present invention utilizes spreading circuitry 202, having Walsh codes that vary at the symbol rate, or are held constant, based on a transmission mode. Additionally, spreading circuitry 202 utilizes a PN code that is held constant for multiple Walsh codes, or is allowed to vary, based on the transmission mode. The utilization of such spreading circuitry allows for the three prior-art spreaders of FIG. 1 to be replaced by a single, less expensive spreader.

Figure 3:
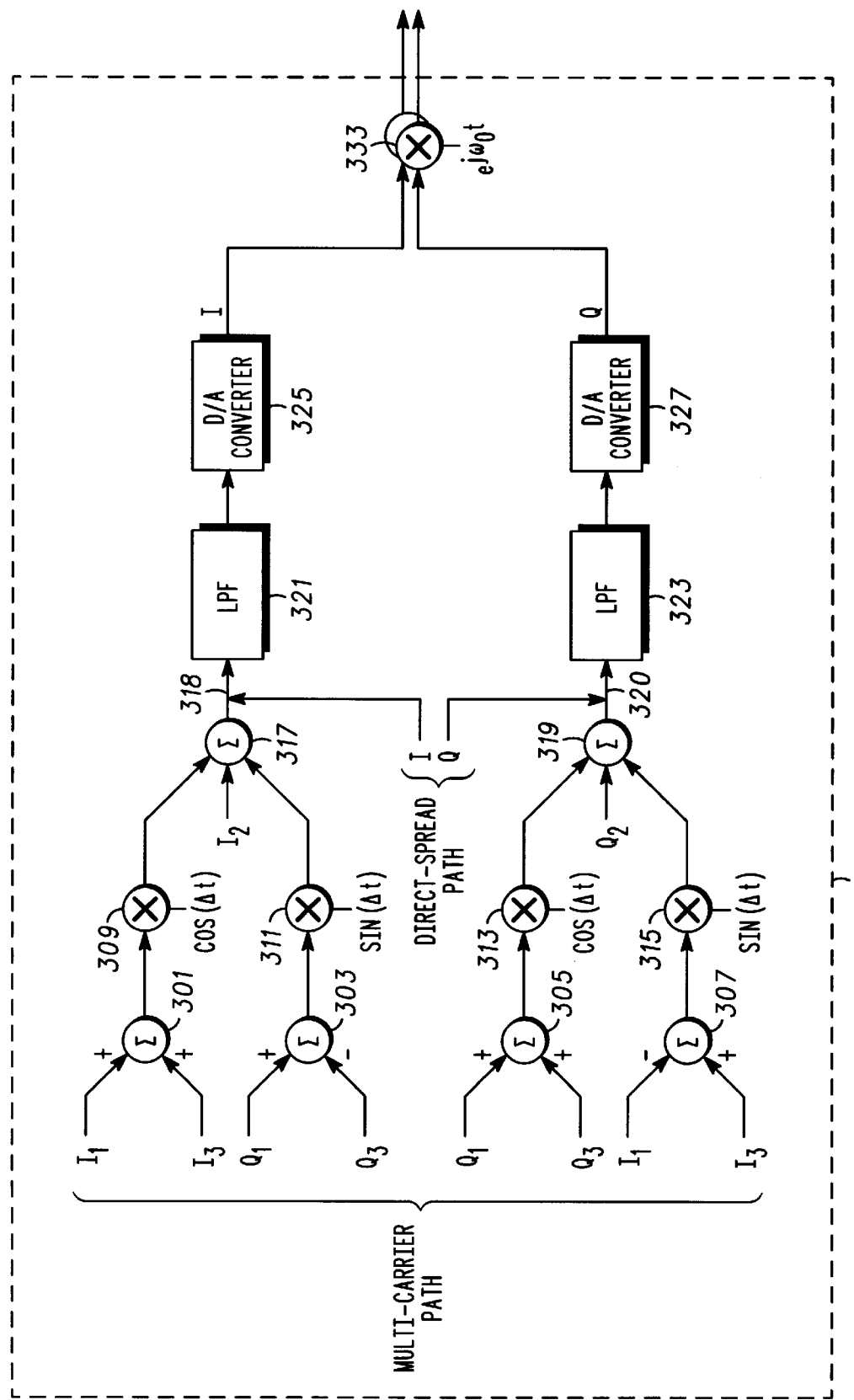
FIG. 3 is a block diagram of a multi-mode transmitter back end in accordance with the preferred embodiment of the present invention.

FIG. 3 is a block diagram of transmitter back end 300 utilized during multi-carrier transmission in accordance with the preferred embodiment of the present invention. In the preferred embodiment of the present invention switch 214 directs each I an Q component to transmitter back end 300 during transmission. As shown, transmitter back end 300 comprises summers 301–307, mixers 309–315, summers 317 and 319, filters 321–323, D/A converters 325–327, filter 331, and mixers 333. During multi-carrier transmission, multiple I and Q components that were output from receiver front end 200 enters receiver back end 300. Receiver back end 300 outputs the I and Q components of the transmitted signal as defined in equations (2) and (3). More particularly, $I_1$ is summed with $I_3$ by summer 301, $Q_3$ is subtracted from $Q_1$ by summer 303, $Q_1$ is added to $Q_3$ by summer 305, and $I_3$ is subtracted from $I_1$ by summer 307. The outputs of summers 301 and 305 enter mixers 309 and 313, respectively, where they are mixed by $\cos(\Delta t)$. Similarly, the outputs of summers 303 and 307 enter mixers 311 and 315, respectively, where they are mixed by $\sin(\Delta t)$. The output from mixers 309 and 311 enter summer 317 where they are summed along with the $I_2$ component, resulting in signal 318. The output from mixers 313 and 315 enter summer 319 where they are summed along with the $Q_2$ component, resulting in signal 320.

Signals 318 and 320 enter filters 321 and 323 respectively, where they are filtered. During direct-spread transmission, the I and Q stream bypasses summers 301–307, mixers 309–315, and summers 317–319, and enters filters 321 and 323 respectively. In the preferred embodiment of the present invention filters 321 and 323 are filters that provide the correct band shape for the appropriate spreading factor as defined RTT cdma2000 proposals. The outputs from filters 321 and 323 are determined by specification and the nature of the combined signals. In the preferred embodiment of the present invention the total bandwidth is 3/2Δ, or 2.25 MHz. The resulting filtered signals are D/A converted by converters 325–327, resulting in I and Q components similar to those in equations (2) and (3). The I and Q components are then mixed to frequency by mixers 333, and radiated by an antenna (not shown) to complete transmission of data stream 210.

As is evident, the transmitter back end 300 in accordance with the preferred embodiment of the present invention utilizes much of the same circuitry for both direct-spread, and multi-carrier transmission. More particularly, the three signal paths of prior-art transmitter 100 (consisting of six low-pass filters, six D/A converters, six mixers) have been replaced by a single signal path (comprising filters 321–323, D/A converters 325–327, and mixers 333).

Figure 4:
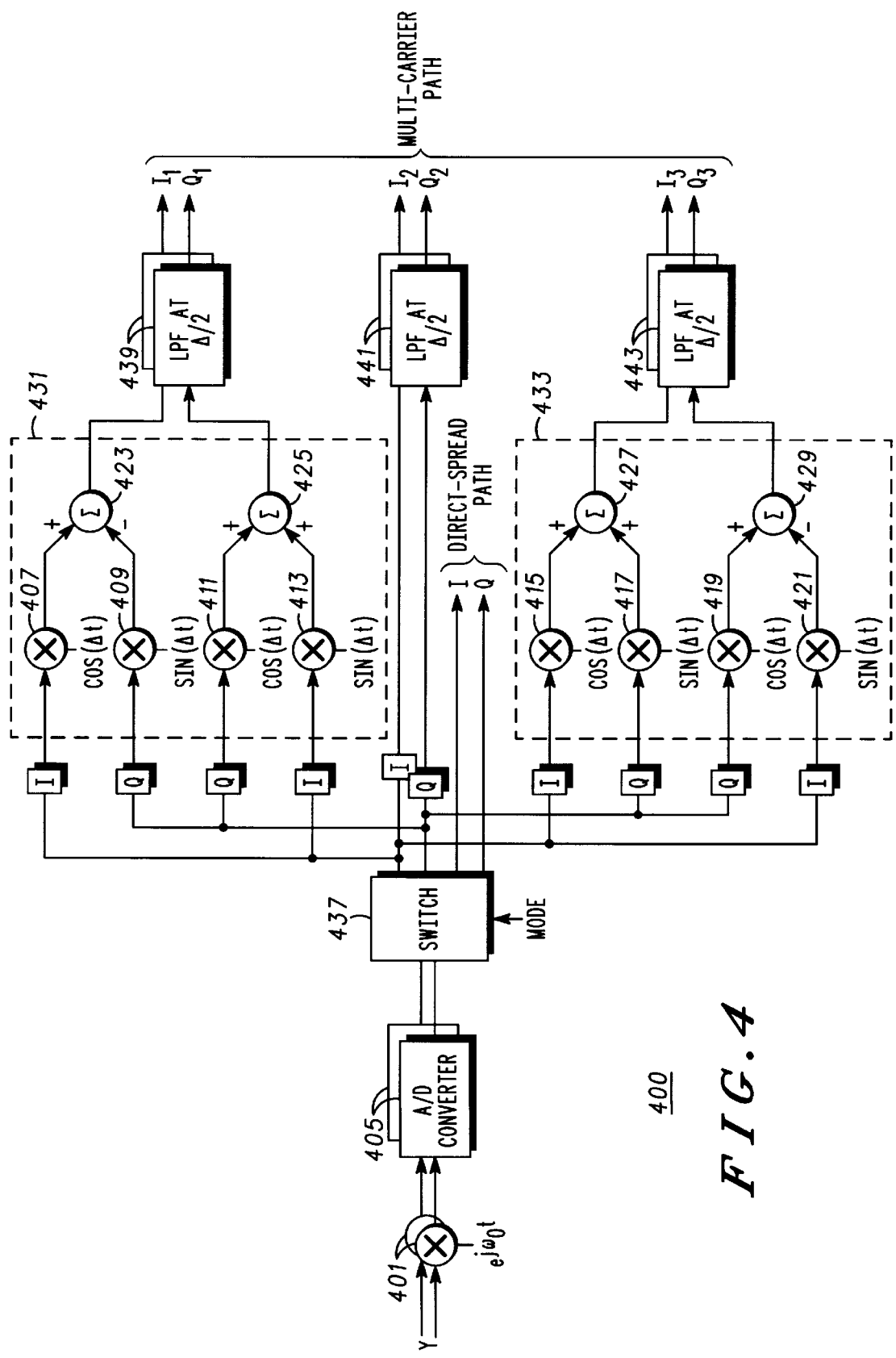
FIG. 4 is a block diagram of a multi-mode receiver front end in accordance with the preferred embodiment of the present invention.

FIG. 4 is a block diagram of multi-mode receiver front end 400 in accordance with the preferred embodiment of the present invention. During operation, signal Y is transmitted in either a multi-carrier, or direct-spread format. For both formats, mixers 401 downconvert, and A/D converters 405 digitally convert the I and Q signal stream. In the preferred embodiment of the present invention switch 437 serves to route the I and Q digital stream based on the current mode of operation. In particular during direct-spread reception, switch 437 simply routes the digital stream to a receiver back end, without further processing. During multi-carrier reception, switch 437 routes the I and Q digital stream to signal extractors 431 and 433, as well as low-pass filter 435.

In the preferred embodiment of the present invention signal extractors 431 and 433 comprise mixers 407–421 and summers 423–429. During operation the I digital stream is mixed with $\cos(\Delta t)$ by mixers 407 and 415. Additionally the I digital stream is mixed with $\sin(\Delta t)$ by mixers 413 and 421. Similarly, the Q digital stream is mixed with $\cos(\Delta t)$ by mixers 411 and 419, and mixed with $\sin(\Delta t)$ by mixers 409 and 417. The output from mixer 409 is subtracted from the output of mixer 407 by summer 423, and the outputs from mixers 411 and 413 are added by summer 425. Similarly, the output from mixer 421 is subtracted from the output of mixer 419 by summer 429, and the outputs from mixers 415 and 417 are added by summer 427. The outputs from summers 423–425 are filtered by filter 439, resulting in the $I_1$ and $Q_1$ components of the transmitted signal (Y). Similarly, the outputs from summers 427–429 are filtered by filters 443, resulting in the $I_3$ and $Q_3$ components of the transmitted signal (Y). The $I_2$ and $Q_2$ components of the transmitted signal (Y) are obtained by directing the I and Q digital stream through filters 441. The $I_1$, $I_2$, $I_3$, $Q_1$, $Q_2$, and $Q_3$ streams are directed to a receiver back end as shown in FIG. 5.

Figure 5:
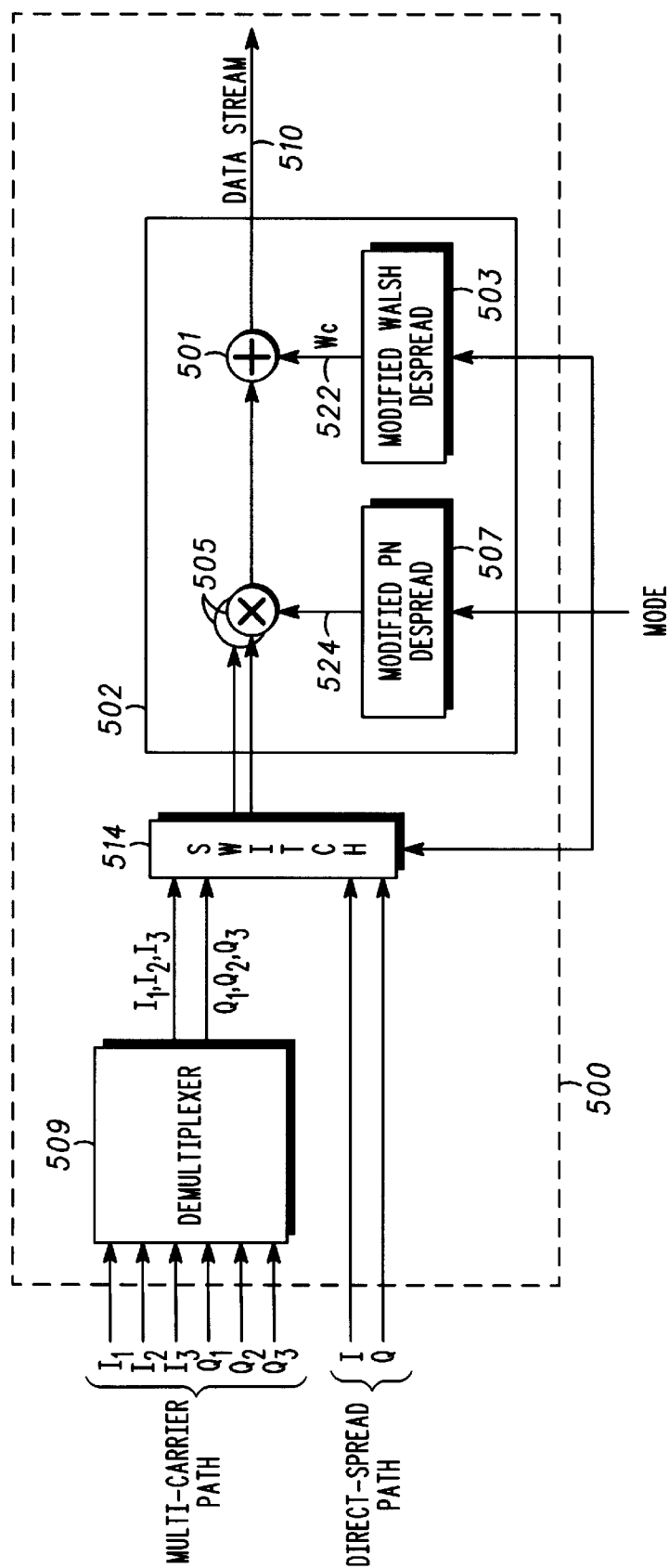
FIG. 5 is a block diagram of a multi-mode receiver back end in accordance with the preferred embodiment of the present invention.

FIG. 5 is a block diagram of multi-mode receiver back end 500 in accordance with the preferred embodiment of the present invention. During operation, switch 514 has a current receive mode as an input, and serves to direct the de-multiplexed multi-carrier path, or the direct-spread path to despreading circuitry 502. The I channel and Q channel spread sequence enters despreading circuitry 502 where it is descrambled by a pair of PN codes 524. In the preferred embodiment of the present invention, PN code 524 is held constant for three Walsh code periods during multi-carrier reception, and is varies at the symbol rate during direct-spread reception. More particularly, during multi-carrier reception, three consecutive Walsh codes share the same time-varying PN code, as if they were received simultaneously, while direct-spread reception varies the PN code with every Walsh code. The resulting despread signal is then provided to Walsh despreader 503.

A current mode of operation is provided to Walsh despreader 503, and based on the current mode of operation, despreader 503 either varies a Walsh code at a symbol rate, or holds the Walsh code constant. During multi-carrier reception a first symbol within the data stream will be despread with a first Walsh code (or its inverse), while symbols immediately preceding and following the first symbol will be despread by a second, differing Walsh code (or its inverse). Additionally, in the preferred embodiment of the present invention during multi-carrier reception all Walsh codes utilized comprise 256 chips. During direct-spread reception, a single Walsh code (or its inverse) is utilized to despread all symbols within the data stream. In the preferred embodiment of the present invention, the Walsh code utilized for direct-spread reception comprises 64 chips.

FIG. 6 is a flow chart illustrating operation of the transmitter of FIG. 2 and FIG. 3 in accordance with the preferred embodiment of the present invention. The logic flow begins at step 601 where it is determined if a current mode of operation is a multi-carrier mode of operation. In the preferred embodiment of the present invention, the current mode of operation can be either a direct-spread or a multi-carrier mode of operation. Next, data stream 210 is received by a first spreader (Walsh spreader 201) and is spread with a time-varying spreading code that varies at a symbol rate (step 603) when the transmitter is operating in a first mode of operation, otherwise data stream 210 is spread with a non varying spreading code (step 604). In particular, during multi-carrier operation data stream 210 is spread with a Walsh code that varies at a symbol rate when the transmitter is operating in a multi-carrier mode, and spread with a non-varying Walsh code when the transmitter is operating in a direct-spread mode of operation. Next, the spread data is further spread with a second spreading code (step 605) that is held constant for a plurality of symbols when operating in the first mode, otherwise the spread data is further spread with a third spreading code (step 606) that varies at the symbol rate. More particularly, the spread data is further spread with a PN code that is held constant for three symbol periods when operating in a multi-carrier mode, otherwise the spread data is further spread with a time-varying PN code that varies at the symbol rate.

Continuing, at steps 607 and 608, a plurality of I and Q components, representative of signal 210 is received at receiver back end 300. If receiver back end 300 is operating in a direct-spread mode, the I and Q components are simply filtered and D/A converted (step 609). However, if receiver back end 300 is operating in a multi-carrier mode, then at step 610 multiple I and Q components are summed and subtracted from each other and mixed with sine and cosine functions, forming signals 318 and 320. In particular $I_1$ is summed with $I_3$ by summer 301, $Q_3$ is subtracted from $Q_1$ by summer 303, $Q_1$ is added to $Q_3$ by summer 305, and $I_3$ is subtracted from $I_1$ by summer 307. The outputs of summers 301 and 305 enter mixers 309 and 313, respectively, where they are mixed by $\cos(\Delta t)$. Similarly, the outputs of summers 303 and 307 enter mixers 311 and 315, respectively, where they are mixed by $\sin(\Delta t)$. The output from mixers 309 and 311 enter summer 317 where they are summed along with the $I_2$ component, resulting in signal 318. The output from mixers 313 and 315 enter summer 319 where they are summed along with the $Q_2$ component, resulting in signal 320. Finally, at step 611 the two signals (signals 318 and 320) are filtered and D/A converted.

FIG. 7 is a flow chart illustrating operation of the receiver of FIG. 4 and FIG. 5 in accordance with the preferred embodiment of the present invention. The logic flow begins at step 701 where it is determined if a current mode of operation is a multi-carrier mode of operation. In the preferred embodiment of the present invention, the current mode of operation can be either a direct-spread or a multi-carrier mode of operation. If, at step 701 it is determined that the current mode of operation is not a multi-carrier mode of operation, then the logic flow continues to step 705, otherwise the logic flow continues to step 703 where the I and Q streams are mixed with sine and cosine functions, summed, and subtracted from each other as described above with reference to FIG. 4. In particular, the I digital stream is mixed with $\cos(\Delta t)$ by mixers 407 and 415. Additionally the I digital stream is mixed with $\sin(\Delta t)$ by mixers 413 and 421. Similarly, the Q digital stream is mixed with $\cos(\Delta t)$ by mixers 411 and 419, and mixed with $\sin(\Delta t)$ by mixers 409 and 417. The output from mixer 409 is subtracted from the output of mixer 407 by summer 423, and the outputs from mixers 411 and 413 are added by summer 425. Similarly, the output from mixer 421 is subtracted from the output of mixer 419 by summer 429, and the outputs from mixers 415 and 417 are added by summer 427. The outputs from summers 423–425 are filtered by filter 439, resulting in the $I_1$ and $Q_1$ components of the transmitted signal (Y). Similarly, the outputs from summers 427–429 are filtered by filters 443, resulting in the $I_3$ and $Q_3$ components of the transmitted signal (Y). The $I_2$ and $Q_2$ components of the transmitted signal (Y) are obtained by directing the I and Q digital stream through filters 441.

Continuing, based on the current mode of operation the I and Q data is then despread with a spreading code (step 707) that is held constant for a plurality of symbols when operating in the first mode, or the data is despread with a spreading code (step 705) that varies at the symbol rate. More particularly, the data is despread with a PN code that is held constant for three symbol periods when operating in a multi-carrier mode, otherwise the data is despread with a time-varying PN code that varies at the symbol rate.

Based on the current mode of operation, the despread data is either further despread with a time-varying code that varies at a symbol rate (step 711) when the transmitter is operating in a first mode of operation, otherwise the data stream is further despread with a non varying spreading code (step 713). In particular, during multi-carrier operation despread data is further despread with a Walsh code that varies at a symbol rate when the receiver is operating in a multi-carrier mode, and further despread with a non-varying Walsh code when the receiver is operating in a direct-spread mode of operation.

While the invention has been particularly shown and described with reference to a particular embodiment, it will be understood by those skilled in the art that various changes in form and details may be made therein without departing from the spirit and scope of the invention.

What is claimed is:

1. A method for operating a multi-mode transmitter, the method comprising the steps of:
    receiving a first, a second, and a third in phase component, and a first, a second, and a third quadrature component;
    determining a mode of operation; and
    based on the mode of operation, summing the first and the third in phase components to produce a first summed component, and subtracting the third quadrature component from the first quadrature component to produce a second summed component;
    based on the mode of operation, mixing the first summed component with a cosine function to produce a first mixed component and mixing the second summed component with a sine function to produce a second mixed component;
    based on the mode of operation, summing the first and the second mixed components with the third in phase component.

2. The method of claim 1 wherein the step of determining the current mode of operation comprises the step of determining if the current mode of operation is a direct-spread mode of operation or a multi-carrier mode of operation.

3. A transmitter comprising:

a first summer having a first and a second in phase (I) component as an input and outputting a sum of the first and the second in phase component;

a second summer having a first and a second quadrature (Q) component as an input and outputting a difference between the second quadrature component and the first quadrature component;

a first mixer having the sum as an input and outputting the sum mixed with a cosine function; and a second mixer having the difference as an input and outputting the difference mixed with a sine function;

a third summer having a third in phase component, the difference mixed with the sine function, and the sum mixed with the cosine function as inputs, and outputting a second sum comprising the sum of the third in phase component, the difference mixed with the sine function, and the sum mixed with the cosine function.

4. The transmitter of claim 3 further comprising:

a fourth summer having a third and a fourth quadrature component as an input and outputting a sum of the third and the fourth quadrature component;

a fifth summer having a fourth and a fifth in phase component as an input and outputting a difference between the fourth and the fifth in phase component;

a third mixer having the sum of the third and the fourth quadrature component as an input and outputting the sum of the third and the fourth quadrature component mixed with the cosine function; and a fourth mixer having the difference between the fourth and the fifth in phase component as an input and outputting the difference between the fourth and the fifth in phase component mixed with the sine function.

5. The transmitter of claim 4 further comprising:

a third summer having a fifth in quadrature component, the difference between the fourth and a fifth in phase component mixed with the sine function, and the sum of the third and the fourth quadrature component mixed with the cosine function as inputs, and outputting a sum of the fifth in phase component, the difference between the fourth and the fifth in phase component mixed with the sine function, and the sum of the third and the fourth quadrature component mixed with the cosine function.

6. A receiver comprising:

a first mixer having an in phase (I) digital stream as an input and outputting the in phase digital stream mixed with a cosine function;

a second mixer having a quadrature (Q) digital stream as an input and outputting the quadrature digital stream mixed with a sine function;

a third mixer having the quadrature digital stream as an input and outputting the quadrature digital stream mixed with the cosine function;

a fourth mixer having the in phase digital stream as an input and outputting the in phase digital stream mixed with the sine function;

a first summer having the in phase digital stream mixed with a cosine function and the quadrature digital stream mixed with a sine function as inputs and outputting a difference between the in phase digital stream mixed with the cosine function and the quadrature digital stream mixed with the sine function; and a second summer having the quadrature digital stream mixed with the cosine function and the in phase digital stream mixed with the sine function as inputs and outputting a sum of the quadrature digital stream mixed with the cosine function and the in phase digital stream mixed with the sine function;

a third summer having the in phase digital stream mixed with a cosine function and the quadrature digital stream mixed with a sine function as inputs and outputting a sum of the in phase digital stream mixed with the cosine function and the quadrature digital stream mixed with the sine function; and a fourth summer having the quadrature digital stream mixed with the cosine function and the in phase digital stream mixed with the sine function as inputs and outputting a difference between the quadrature digital stream mixed with the cosine function and the in phase digital stream mixed with the sine function.

* * * * *